(12) United States Patent
Hamburgen et al.

(10) Patent No.: US 8,767,394 B1
(45) Date of Patent: Jul. 1, 2014

(54) ONE-HANDED BROWSING APPLIANCE

(75) Inventors: William Hamburgen, Palo Alto, CA (US); Lawrence Lam, San Jose, CA (US); Felix Jose Alvarez Rivera, San Jose, CA (US)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 13/271,202

(22) Filed: Oct. 11, 2011

Related U.S. Application Data

(60) Provisional application No. 61/454,778, filed on Mar. 21, 2011.

(51) Int. Cl.
*G06F 1/16* (2006.01)
*G02F 1/1335* (2006.01)

(52) U.S. Cl.
USPC ............. 361/679.56; 361/679.3; 345/905; 349/58

(58) Field of Classification Search
CPC ... G06F 1/1626; G06F 1/1656; G06F 1/1698; G06F 2200/1632; G06F 1/1632; G06F 1/1601; G06F 1/1616; G06F 1/1637; G06F 1/203; G06F 1/1679; G06F 1/1635; G06F 2200/1633; G06F 1/181; G06F 1/184; G06F 1/187; G06F 1/186; G11B 33/124; G02F 1/133608; G02F 1/13452; G02F 2001/133317; G02F 1/133615
USPC ............ 361/679.26, 679.3, 679.55–679.56; 312/223.2; 248/917–918; 345/905; 349/58
See application file for complete search history.

(56) References Cited

U.S. PATENT DOCUMENTS

| | | | | |
|---|---|---|---|---|
| 5,574,625 A | * | 11/1996 | Ohgami et al. | 361/679.09 |
| 5,887,962 A | * | 3/1999 | Tsai | 312/351.9 |
| 6,028,765 A | * | 2/2000 | Swindler et al. | 361/679.55 |
| 6,269,225 B1 | * | 7/2001 | Sato et al. | 396/429 |
| 6,304,170 B1 | * | 10/2001 | Armstrong et al. | 340/407.1 |
| 6,560,092 B2 | * | 5/2003 | Itou et al. | 361/679.55 |
| 6,937,464 B2 | * | 8/2005 | Adams et al. | 361/679.3 |
| 7,558,057 B1 | * | 7/2009 | Naksen et al. | 361/679.56 |
| 7,821,782 B2 | * | 10/2010 | Doherty et al. | 361/679.26 |
| 2001/0055196 A1 | * | 12/2001 | Anzai et al. | 361/681 |
| 2002/0000997 A1 | * | 1/2002 | Selli et al. | 345/659 |
| 2002/0183862 A1 | * | 12/2002 | Chen et al. | 700/1 |
| 2003/0048598 A1 | * | 3/2003 | Lee et al. | 361/681 |
| 2006/0056138 A1 | * | 3/2006 | Chen | 361/681 |
| 2008/0212271 A1 | * | 9/2008 | Misawa | 361/681 |
| 2008/0259551 A1 | * | 10/2008 | Gavenda et al. | 361/684 |
| 2009/0149223 A1 | * | 6/2009 | Friedman et al. | 455/566 |
| 2010/0053861 A1 | * | 3/2010 | Kim et al. | 361/679.01 |
| 2011/0038118 A1 | * | 2/2011 | Sip et al. | 361/679.27 |
| 2011/0170248 A1 | * | 7/2011 | Hirota | 361/679.01 |
| 2012/0002357 A1 | * | 1/2012 | Auld et al. | 361/679.01 |

* cited by examiner

*Primary Examiner* — Zachary M Pape
(74) *Attorney, Agent, or Firm* — Brake Hughes Bellermann LLP

(57) ABSTRACT

An apparatus includes a processor and a display that is operably coupled to the processor. The display includes four sides, where each of the four sides is substantially equal in length, a center of mass for the apparatus is located between a geometric center of the apparatus and an edge of one of the four sides and the edge of one of the four sides includes a grip area that is located on a same side as the center of mass for the apparatus.

18 Claims, 13 Drawing Sheets

ONE-HANDED BROWSING APPLIANCE

CROSS REFERENCE TO RELATED APPLICATIONS

This application claims the benefit of U.S. Provisional Application No. 61/454,778, filed on Mar. 21, 2011, entitled "ONE-HANDED BROWSING APPLIANCE," which is hereby incorporated by reference in its entirety.

TECHNICAL FIELD

This description relates to a one-handed browsing appliance.

BACKGROUND

Electronic devices, including mobile electronic devices such as laptop computers, tablet computers, electronic reading devices and mobile phones, are increasing in numbers in the market and increasing in use by the public. One consideration in the design of these devices is the comfort of the user in holding the device, especially over a period of time. It is desirable to have electronic devices that are easy and comfortable for a user to hold.

SUMMARY

According to one general aspect, an apparatus includes a processor and a display that is operably coupled to the processor. The display includes four sides, where each of the four sides is substantially equal in length, a center of mass for the apparatus is located between a geometric center of the apparatus and an edge of one of the four sides and the edge of one of the four sides includes a grip area that is located on a same side as the center of mass for the apparatus.

Implementations may include one or more of the following features. For example, the center of mass for the apparatus may be located substantially near the edge of one of the four sides. The center of mass for the apparatus may be located substantially near a center of the edge of one of the four sides. The grip area may include a substantially cylindrical tube along at least a portion of the edge. The grip area may include a trapezoidal-shaped grip area. The grip area may include a parallelogram-shaped grip area. The grip area may include one or more device controls located on an underside of the device. The display may include a flexible display portion. The apparatus may further include a substantially cylindrical grip area along the edge of one of the four sides, where the flexible display is configured to roll into the cylindrical grip area. At least a portion of the display may include a transparent display. The display may include two screen sections. Each of the screen sections may be foldable. The apparatus may be configurable to be oriented to stand on the edge of the side closet to the center of mass for the apparatus.

In another general aspect, an apparatus includes a processor, a display that is operably coupled to the processor, where the display includes a flexible display portion and a grip area along an edge of the display, where the flexible display portion is configured to be stored within the grip area.

Implementations may include one or more of the following features. For example, the grip area may be substantially cylindrical in shape and the flexible display may be configured to roll into the grip area. At least a portion of the display may include a transparent material. A center of mass for the apparatus may be located between a geometric center of the apparatus and the grip area. A center of mass for the apparatus may be located substantially near the grip area. A center of mass for the apparatus may be located substantially near a center of the grip area.

In another general aspect, an apparatus includes a housing for a mobile device, a display within the housing and one or more components located within the housing substantially near an edge of the housing, where a center of mass for the apparatus is located between a geometric center of the apparatus and the edge of the housing.

Implementations may include one or more of the following features. For example, the center of mass for the apparatus may be located substantially near the edge of the housing. The housing may be square-shaped and the display may be square-shaped. The housing may be circular-shaped and the display may be square-shaped. The housing may be rectangular-shaped and the display may be rectangular-shaped. The apparatus may include a grip area that is located on the edge where the center of mass is located. The grip area may include a cylindrical-shaped grip area. The grip area may include a trapezoidal-shaped grip area. The grip area may include a parallelogram-shaped grip area. The grip area may include one or more device controls located on an underside of the device.

The details of one or more implementations are set forth in the accompanying drawings and the description below. Other features will be apparent from the description and drawings, and from the claims.

DETAILED DESCRIPTION

In one exemplary implementation, an electronic device (or device) includes at least a processor, a power source (e.g., one or more batteries) and a display. The electronic device may include other components such as, for example, an antenna, one or more radios (e.g., a Bluetooth radio, a cellular radio, etc.), a memory, and other components. A center of mass of the electronic device may be offset from the geometric center of the device towards one of the edges of the electronic device. For example, in one exemplary implementation, the center of mass may be located between the geometric center of the device and one of the edges. In another exemplary implementation, a center of mass of the electronic device may be located substantially near one of the edges of the electronic device. In this manner, in any of the various exemplary implementations, a user may use a single hand to grip and hold the electronic device. The electronic device may be held more comfortably using a single hand for longer periods of time than if the center of mass were located elsewhere or if the mass of the device was more evenly distributed over the device. Also, in this manner, the device may be balanced in a single hand of the user.

As illustrated in the figures and discussed in more detail below, the electronic device may be made in different sizes and different shapes, while still having the center of mass located between the center of the device and an edge, including substantially near an edge. In some exemplary implementations, the edge where the center of mass is located may include a grip area, which also may be referred to in this document as a grip zone. The grip area may be an area that is an extruded part of the device case and it may be fashioned into different shapes, as illustrated and discussed in more detail below. Alternatively or additionally, the electronic device also may include a handle. The handle may be shaped to allow for a comfortable grip by the user. Also, the electronic device may include an accelerometer module that is configured to sense a rotation of the device so that the electronic device may rotate the content on the display to be upright with respect to the user. In this manner, the electronic device may be held comfortably in either the user's right hand or left hand and still remained balanced in the user's hand.

Figure 1A:
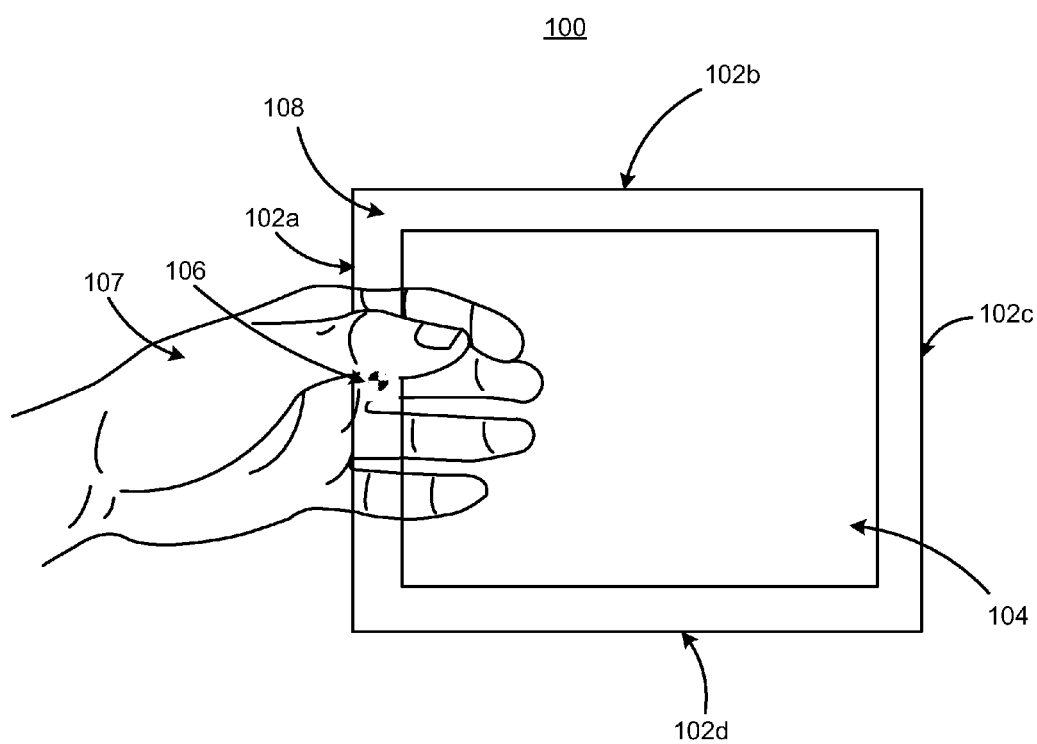
FIGS. 1A and 1B are exemplary sketches of an electronic device having a square shape.
Figure 1B:
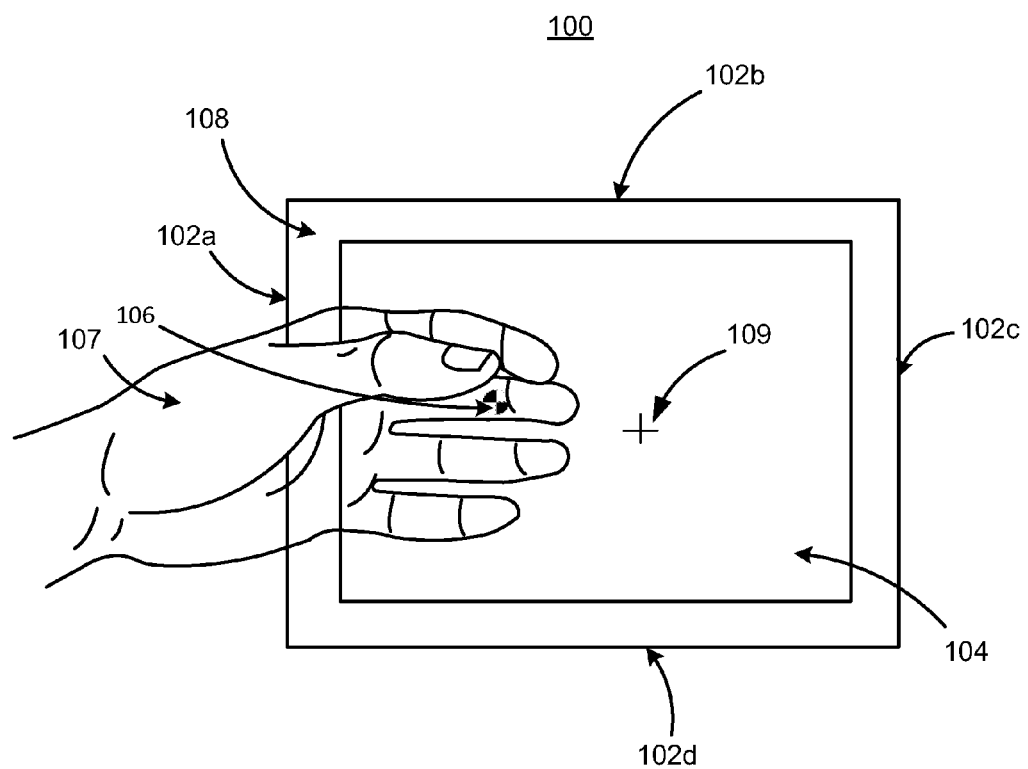

FIGS. 1A and 1B are exemplary sketches of an electronic device 100 having a square shape. The electronic device 100 may be square-shaped and include four sides 102a-102d that are substantially equal in length. The device 100 may include a display 104, where the display 104 is also square-shaped. In the examples of FIGS. 1A and 1B, as well as in the other exemplary figures described in this document, the electronic device 100 may be any type of electronic device. For example, the electronic device 100 may be a tablet computer, a laptop computer, a smart phone, a notebook computer, a combination of these devices or any other type of mobile electronic device.

The electronic device 100 includes a center of mass 106 the device. Throughout this document the terms "center of mass" and the terms "center of gravity" may be used interchangeably to mean a point on the device where the weight for a device is centered or concentrated such that it is the point at which the device may be balanced. While the terms "center of mass" and "center of gravity" may have different scientific meanings in physics, here there are used interchangeably to mean the same thing because the device is assumed to be used in the earth's uniform gravitational field.

In the exemplary implementation of FIG. 1A, the center of mass 106 is located substantially near one of the edges or sides of the device. In the exemplary implementation of FIG. 1B, the center of mass 106 is located between the center of the device and one of the sides. These exemplary implementations are discussed in more detail below.

In FIG. 1A, the electronic device 100 is designed such that the center of mass 106 is located substantially near one of the sides 102a. Substantially near an edge means that the center of mass for the device is closer to the edge than to the center of the device. Substantially near the edge may mean that the center of mass is at the edge of the device; however, the center of mass is not required to be right at the edge, but instead may be offset some distance from the edge.

In this manner, the user may hold the electronic device 100 substantially level with one hand 107. The device 100 may be easily balanced with a single hand. The device 100 may be comfortable to hold with one hand because the center of mass 106 for the device 100 would be located at a point near the edge 102a where the user's hand would grip the device 100. The center of mass 106 would be in the user's hand that is holding the device 100.

Additionally or alternatively, the user may hold the device with two hands with one hand under the side 102a and the other hand under the side 102c. With the center of mass 106 for the device 100 located near the side 102a, the hand holding the side 102a would support the majority of the weight. The hand holding the side 102c may only need to support any remaining offset moment for the device 100 to keep the device 100 level.

In one exemplary implementation, the center of mass 106 may be located near the side 102a by locating most or all of the components for the device 100, other than the display 104, near the side 102a. Exemplary components for the device 100 are illustrated in block diagram form in FIG. 5 below. For example, one or more processors, one or more batteries, one or more radios, a memory, an accelerator module and other components all may be located near the side 102a such that the center of mass 106 for the device 100 is substantially near the side 102a.

In one exemplary implementation, one or more optional weights (not shown in FIGS. 1A and 1B) may be used to move the center of gravity 106 near the side 102a. For example, one or more weights may be placed near the side 102a to locate the center of gravity 106 for a weight of the device 100 near the side 102a.

In one exemplary implementation, the electronic device 100 may include the accelerator module (not shown in FIGS. 1A and 1B). The accelerator module may enable any content shown on the display 104 to remain correctly oriented as the device 100 is rotated. The accelerator module is configured to sense the rotation of the device 100 and to signal the processor and the display 104 to maintain content shown on the display 104 correctly oriented for the user to view the content. In this manner, the user may either hold the side 102a where the center of mass 106 for the device is located with either hand.

In one exemplary implementation, the display 104 is a substantially square-shaped display. The display 104 is square-shaped with a wide viewing angle. The display 104 may include a pixel count that is of sufficient quantity to support a high-definition display. For example, the sides 102a-102d of the device 100 each may be equal to the width of a standard sheet of paper, 8.5 inches. A margin area 108 may be approximately 1.25 inches around the display 104.

Each side of the display 104 may be sized at approximately 7.25 inches. A display resolution of 1920×1920 pixels for this size display would result in approximately 265 pixels per inch (ppi). At this resolution, full page-sized documents would be able to be displayed at about a 75% scale, which would enable most documents to be easily readable. This is merely one example and other sized devices and displays are within the scope of this document, which may result in different display resolutions.

In FIG. 1B, the electronic device 100 is designed such that the center of mass 106 is located between the geometric center 109 of the device and one of the sides 102a. Between the geometric center 109 of the device and one of the sides means that the center of mass for the device may be located anywhere that is offset from the geometric center 109 of the device towards one of the edges of the device. The center of mass 106 may be located anywhere between the geometric center 109 and one of the sides of the electronic device 100. In this manner, by moving the center of mass 106 away from the geometric center 109, the electronic device may be held more comfortably by a user with a single hand 107. Thus, in the example of FIG. 1B, the center of mass 106 may be located approximately halfway between the geometric center 109 and one of the sides. In other examples, the center of mass 106 may be only slightly offset from the geometric center 109 towards one of the sides. In other examples, the center of mass 106 may be located closer to one of the sides than to the geometric center 109.

Throughout the example implementations described below, the center of mass may be located between the geometric center of the device and one of the sides, including substantially near one of the sides.

Figure 2A:
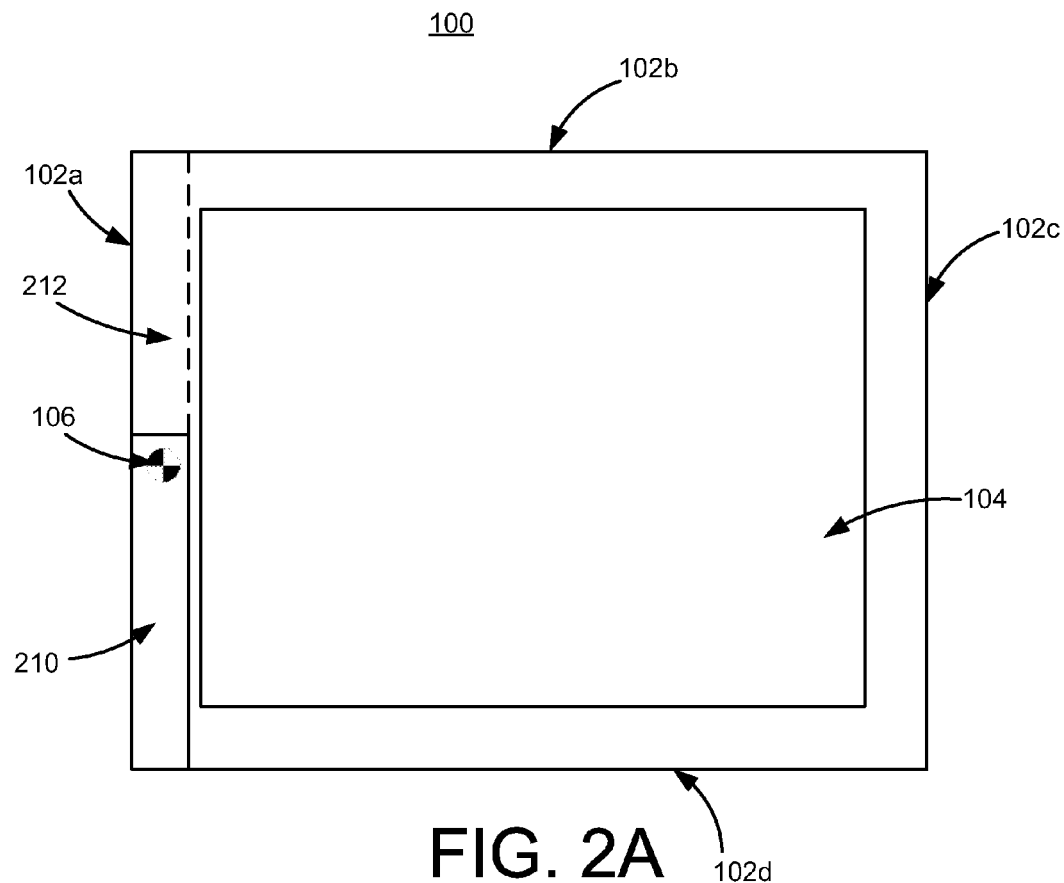
FIG. 2A is a top view of an exemplary sketch of an electronic device having a square shape and a grip area.
Figure 2B:
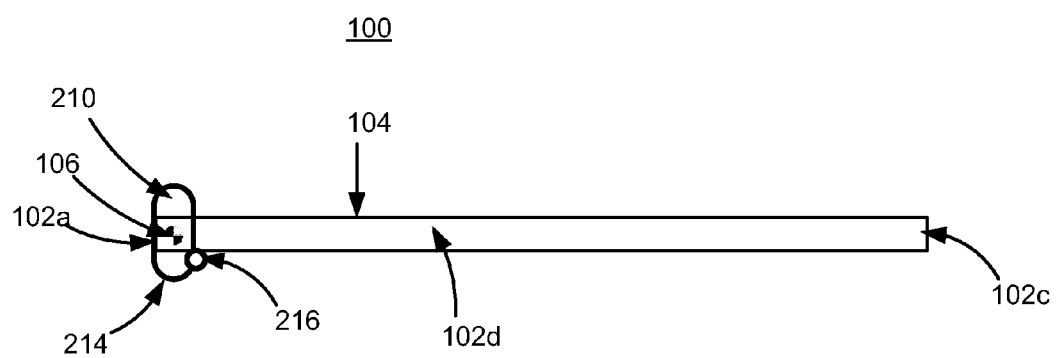
FIG. 2B is a side view of an exemplary sketch of the electronic device of FIG. 2A having a square shape and a grip area.

Referring to FIGS. 2A and 2B, a top view (FIG. 2A) and a side view (FIG. 2B) illustrate an exemplary sketch of the electronic device 100 from FIGS. 1A and 1B with a grip area 210. The grip area 210 also may be referred to in this document as a grip zone or a handle. The electronic device 100 illustrated in FIGS. 2A and 2B is the same electronic device as illustrated in FIGS. 1A and 1B, where the center of mass 106 for the device 100 is located substantially near a side 102a.

In the examples of FIGS. 2A and 2B, the grip area 210 surrounds at least a portion of the side 102a. The grip area 210 may be thicker or wider than the other portions of the device 100 to make it easier and more ergonomically comfortable for the user to hold with one hand. In one exemplary implementation, the center of mass 106 may be located within the grip area 210. The device 100 may be rotated and held by the user comfortably using either hand.

In other exemplary implementations (not shown), the center of mass 106 may be offset from the geometric center of the device 100 and located towards the grip area 210 without actually being located in the grip area 210. Having the center of mass 106 located towards the grip area 210 also allows the user to hold the device 100 in a comfortable manner in a single hand.

In one exemplary implementation, the grip area 210 may optionally extend along the entire length of the side 102a. In this manner, the grip area 210 may include both the grip area 210 and the grip area 212, which is represented by the optional dotted lines. In another exemplary implementation, the grip area 210 may extend beyond either or both edges 102b and 102d.

In one exemplary implementation, the grip area 210 may occupy only a portion of the side 102a, but may slide along the side 102a from one grip zone 210 to the other grip zone 212. The grip area 210 also may slide and stop anywhere along the side 102a, as may be desired by the user. The grip area 210 may be of sufficient length such that no matter where it is moved along the side 102a, the center of mass 106 is still located within the grip area. In this manner, the device 100 may be rotated and the grip zone 210 may be adjusted, as desired by the user, depending on which hand is holding the device 100.

In implementations where the grip area 210 is slidable along the side 102a, the grip area 210 may lock into place anywhere along the side 102a. In one implementation, the grip area 210 may use friction to lock into place. In other implementations, other locking or stopping mechanisms may be used.

In one exemplary implementation, the grip area 210 may include one or more rounded edges 214. The rounded edges may provide an oblong shape or a cylindrical shape to the grip area 210 depending on the thickness of the grip area 210. In other exemplary implementations where less than all four of the edges of the grip area 210 are rounded, the non-rounded edges may be squared-off. In other exemplary implementations, none of the edges of the grip area 210 may be rounded. Instead, the edges may be squared-off.

The grip area 210, as illustrated in FIG. 2B, provides an area to allow the user's thumb to wrap around the top of the device 100 and the opposing fingers to wrap around the bottom of the device 100 to hold the device 100 comfortably in one hand.

In one exemplary implementation, the grip area 210 may be implemented using a rubber-type material. The material may be smooth all over or it may include a texture or pattern on the outside of the material. The texture or pattern on the outside of the grip area 210 may make it easier for the user to grip using a single hand.

In other exemplary implementations, the grip area 210 may be implemented using other types of material including, for example, a same material that is used for the housing of the device 100. For instance, the grip area 210 may be molded and fixed in place as part of the housing for the device 100. In this manner, the grip area 210 may be integrally formed with and/or extruded from the same material as the housing of the device 100.

While the device 100 having the grip area 210 is illustrated and described above as being substantially square-shaped, the device 100 may be rectangular-shaped where sides 102b and 102d are equal in length and longer than sides 102a and 102c, which also are equal in length. A rectangular-shaped device may include a center of mass 106 for the device that is located between the geometric center of the device and one of the sides, including substantially near the side 102a. The side 102a also may include a grip area 210, as described above.

In another exemplary implementation, the device 100 may be rectangular-shaped where sides 102b and 102d are equal in length and longer than sides 102a and 102c, which are also equal in length. A rectangular-shaped device may include a center of mass 106 for the device that is located between the geometric center of the device and one of the longer sides, 102b or 102d, including substantially near one of the longer sides 102b or 102d. One of the longer sides, 102b or 102d, may include a grip area 210, as described above.

In one exemplary implementation, the grip area 210 may include one or more device controls 216. The device controls 216 may include a track ball, one or more buttons for cursor control, an on/off control and/or an a touch pad. As described, multiple different types of device controls 216 may be located on the grip area 210. The device controls 216 may be located on the under side of the device and may be operated by the user's hand that is holding the device by using the opposing fingers that are gripping under the device.

Figure 2C:
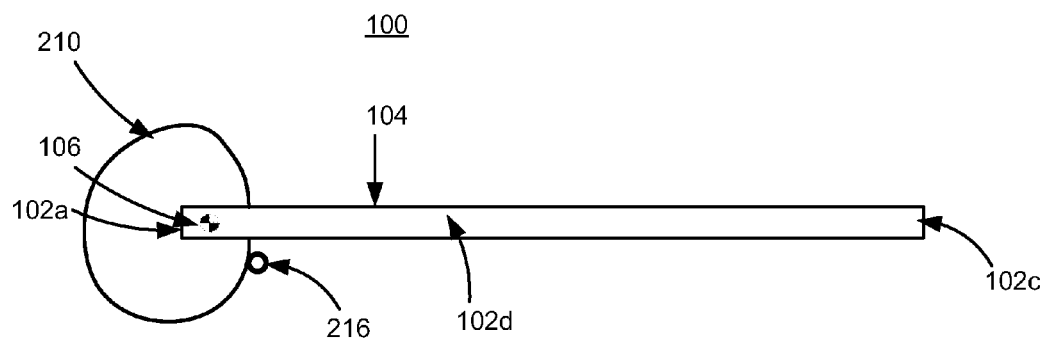
FIG. 2C is an alternated side view of an exemplary sketch of the electronic device of FIG. 2A having a cylindrical-shaped grip area.

Referring to FIG. 2C, an alternate side view of the device 100 of FIG. 2A is illustrated. In the example of FIG. 2C, the grip area 210 is illustrated as a circular or more cylindrical-shaped grip area. A circular or cylindrical-shaped grip area is one example of the grip area 210 with the center of mass 106 located within the grip area 210 to allow the user to grip and hold the device with a single hand. In this example, the cylindrical-shaped grip area may provide a housing for one or more components of the device 100 including, for instance, a single row of batteries to power the device. In this example, the cylindrical-shaped grip area also may include one or more device controls 216, as discussed in detail above.

Figure 3A:
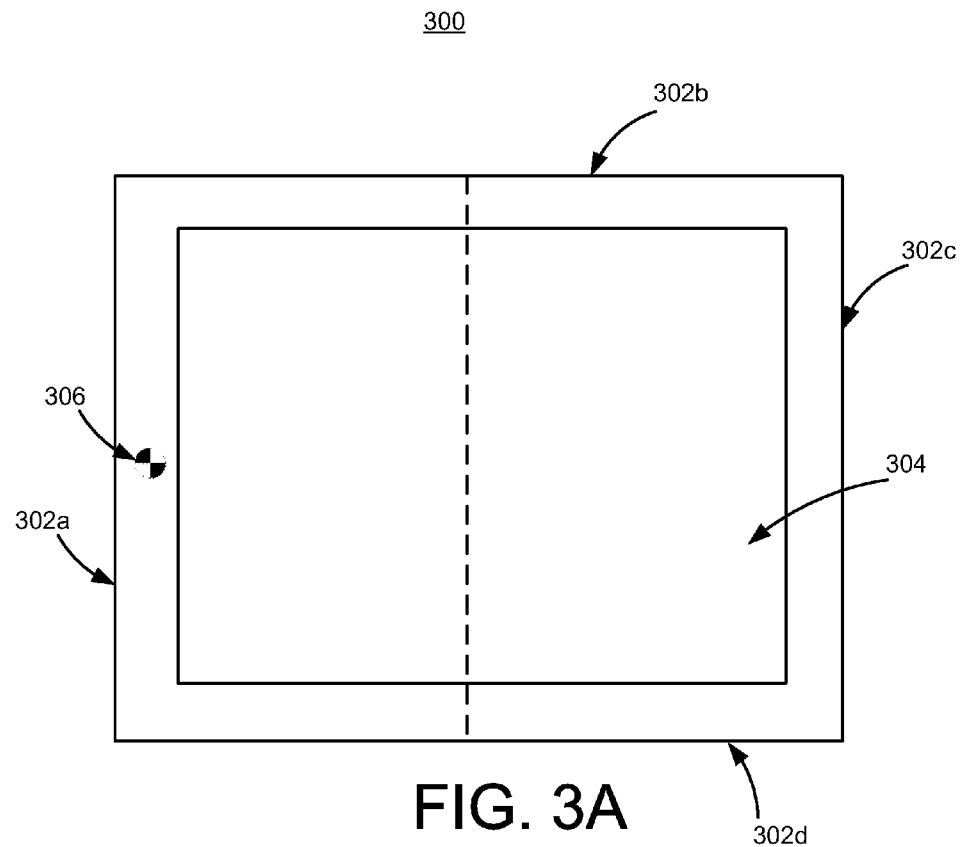
FIG. 3A is a top view of an exemplary sketch of an electronic device.
Figure 3B:
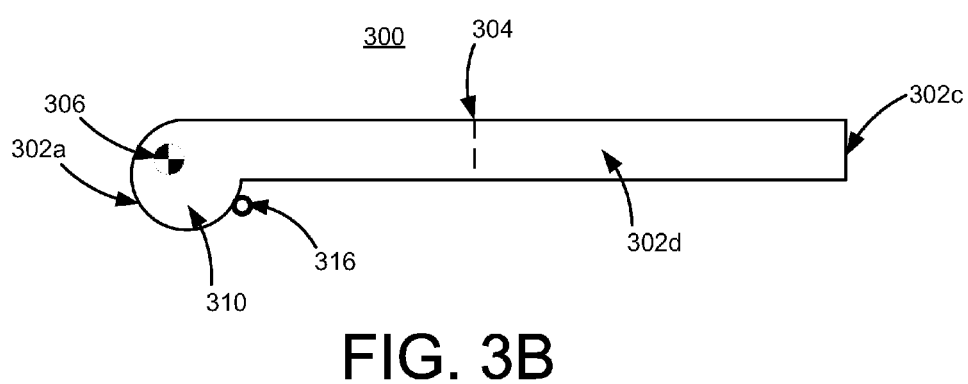
FIG. 3B is a side view of an exemplary sketch of the electronic device of FIG. 3A having a cylindrical-shaped grip area.

Referring to FIGS. 3A and 3B, a top view (FIG. 3A) and a side view (FIG. 3B) illustrate an exemplary sketch of an electronic device 300 having a cylindrical-shaped handle. The electronic device 300 may be square-shaped or rectangular-shaped. The electronic device 300 includes four sides 302a-302d. If the device 300 is square-shaped, then the sides 302a-302d are substantially equal in length. If the device 300 is rectangular-shaped, then sides 302a and 302c are substantially equal in length and shorter than sides 302b and 302d, which are substantially equal in length.

The electronic device includes a display 304. The electronic device 300 illustrated in FIGS. 3A and 3B may be any type of electronic device, as described above with respect to electronic device 100 of FIGS. 1A and 1B.

The electronic device 300 includes a center of mass 306 for the device 300 that is located substantially near a side 302a. The device 300 also includes a grip area 310 on the side 302a where the center of mass 306 is located. In one exemplary implementation, the grip area 310 is a cylindrical-shaped grip area. The grip area 310 extends along at least a portion of the side 302a and may extend along the entire length of the side 302a. In some implementations, the grip area 310 may extend beyond either or both ends of the side 302a.

The center of mass 306 may be located within the grip area 310. In this manner, a user may easily balance the device 300 comfortably using a single hand because of the center of mass 306 is located near the side 302a and/or because of the cylindrical-shaped grip area 310. The user may use a second hand on the side 302c only to support any remaining offset moment for the device 300 to keep the device 300 level.

The cylindrical-shaped grip area 310 may be sized to allow a user's fingers to wrap around the underside of the handle so that the fingertips support the bottom surface of the device 300. As discussed above with respect to FIG. 2B, the device 300 also may include one or more device controls 316 located on an underside of the grip area 310 for use by the user's fingers to control the functionality of the device 300. In one exemplary implementation, the grip area 310 is fixed to the device 300. In other exemplary implementations, the grip area 310 may be removed from the device. In this manner, grip areas having different diameters may be used and switched out on the device depending on the size of the user's hand.

In one exemplary implementation, the diameter of the grip area 310 may be sized to accommodate the components of the device 300 including, for instance, one or more batteries, one or more radios, at least one processor, at least one memory, an accelerometer module and other components. By locating the components within the grip area 310, the center of mass 306 is located substantially near the side 302a. The accelerometer module, as discussed above, allows the user to rotate the device 300 and hold the device with either handle while the content on the display 304 rotates to remain upright with respect to the user.

In one exemplary implementation, one or more optional weights (not shown) may be used to move the center of mass 306 near the side 302a. For example, one or more weights may be placed inside the grip area 310 to locate the center of mass 306 for the device 300 near the side 302a.

While the center of mass 306 is described and illustrated as being located substantially near one of the sides, other exemplary implementations may locate the center of mass anywhere between the geometric center of the device and one of the sides.

In one exemplary implementation, the device 300 illustrated in FIGS. 3A and 3B may optionally include two displays, as shown by the dotted line, instead of the single display 304. The two displays may be configured to display the same content on both displays or may be configured to display different content on each display. In this example, each display may include a 2:1 aspect ratio display.

One display may fold onto the other display. For instance, the display further from the grip area 310 may fold on to the display closest to the grip area 310. In some implementations, the displays may be both powered on or one of the displays may be on and the other display may be off or otherwise in a power saving mode. In one exemplary implementation, the displays may be arranged at right angles to one another with both displays on.

While not illustrated, other-shaped devices having a cylindrical grip area, similar to grip area 310, may be used.

Figure 3C:
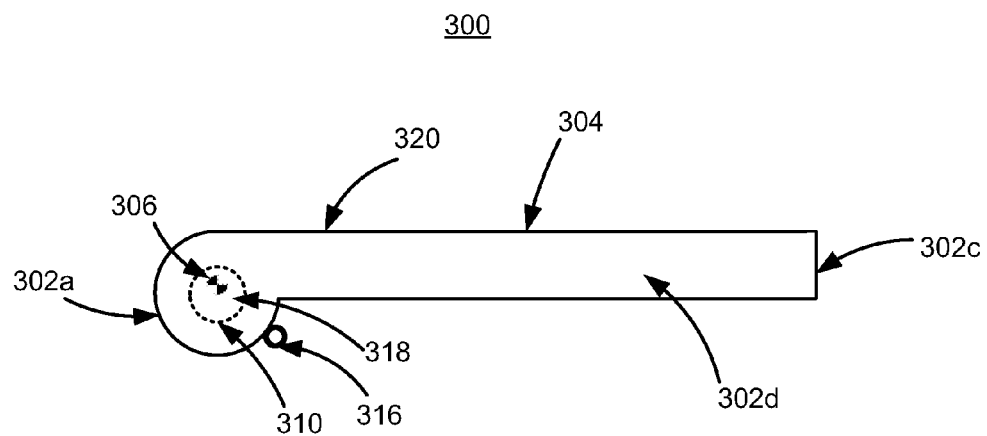
FIGS. 3C and 3D are side views of an exemplary sketch of the electronic device of FIG. 3A having a flexible display and a cylindrical-shaped grip area.
Figure 3D:
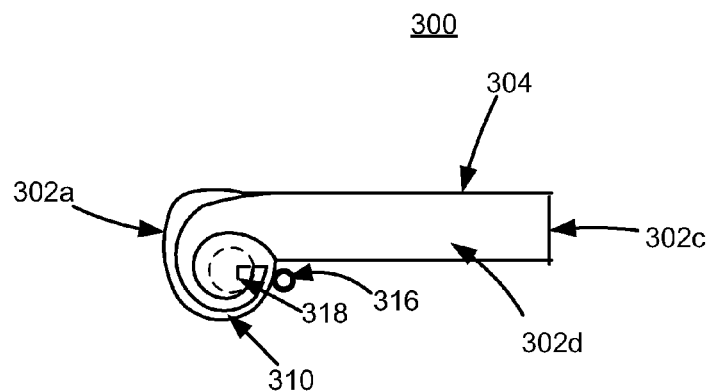

Referring to FIGS. 3C and 3D, a side view (FIG. 3C) and a side view (FIG. 3D) illustrate an exemplary sketch of an electronic device having a cylindrical-shaped grip area and a flexible display, which may roll up into the grip area. The electronic device 300 illustrated in FIGS. 3C and 3D is the same electronic device as illustrated in FIGS. 3A and 3B, except that the display 304 is flexible enough to roll into the grip area 310 without damaging the display.

In this exemplary implementation, the display 304 may be an organic light emitting diode (OLED) screen, using organic thin-film transistors (OTFTs), that is flexible such that it can be wound around a roller 318 inside the cylindrical grip area 310. At the same time, the display 304 may be rigid enough to remain flat and level when unrolled. In other exemplary implementations, the display 304 may be made of other materials that exhibit the same or similar properties. FIG. 3C illustrates the display 304 as fully extended and viewable. In FIG. 3C, the display may enter the grip area 310 at a point 320. The grip area 310 may include an opening at the point 320 where the display may enter and exit the grip area 310.

FIG. 3D illustrates the display 304 when partially wound around the roller 318 inside the grip area 310. In one exemplary implementation, the roller 318 may include a spring and lock mechanism to enable the flexible display 304 to extend and lock in place, as shown in FIG. 3C. The spring and lock mechanism on the roller 318 also may enable the flexible display 304 to retract into the grip area 310 and automatically wind itself around the roller 318. For instance, a slight pull and release on the display 304 when it is at least partially extend may cause the spring mechanism on the roller 318 to wind roller 318 and to retract the display 304 into the grip area 310. In other exemplary implementations, other mechanisms may be used to wind the roller 318 and to retract the display 304 into the grip area 310 including, for instance, a mechanism to enable the user to wind the roller 318 and retract the display 304 into the grip area 310.

Figure 3E:
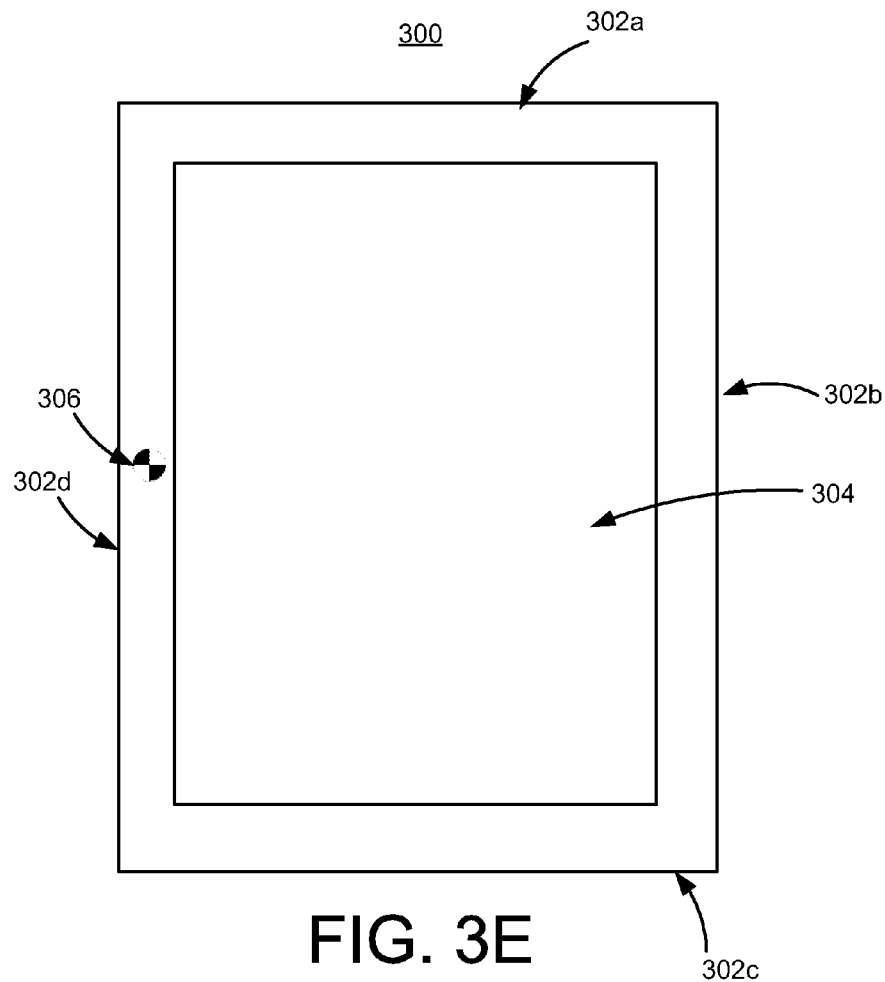
FIG. 3E is a top view of an exemplary sketch of an electronic device.
Figure 3F:
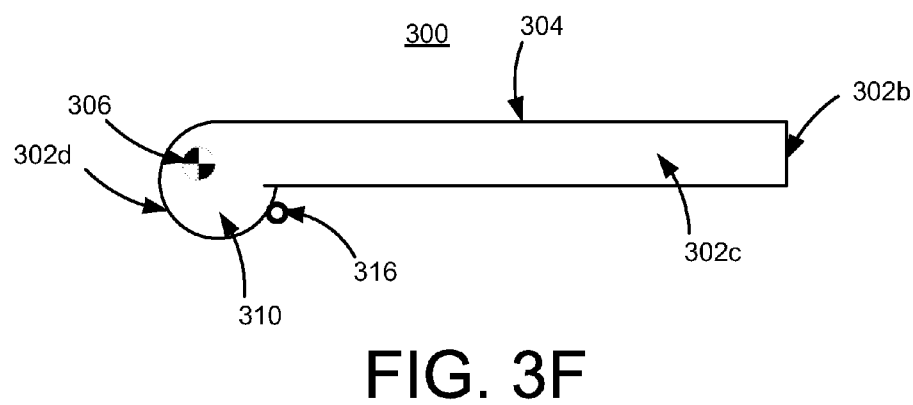
FIG. 3F is a side view of an exemplary sketch of the electronic device of FIG. 3E having a cylindrical-shaped grip area.

Referring to FIGS. 3E and 3F, a top view (FIG. 3E) and a side view (FIG. 3F) illustrate an exemplary sketch of an electronic device 300 having a cylindrical-shaped handle. The electronic device 300 may be square-shaped or rectangular-shaped. The electronic device 300 includes four sides 302a-302d. If the device 300 is square-shaped, then the sides 302a-302d are substantially equal in length. If the device 300 is rectangular-shaped, then sides 302a and 302c are substantially equal in length and shorter than sides 302b and 302d, which are substantially equal in length.

The electronic device includes a display 304. The electronic device 300 illustrated in FIGS. 3E and 3F may be any type of electronic device, as described above with respect to electronic device 100 of FIGS. 1A and 1B.

The electronic device 300 is the same as the one illustrated in FIGS. 3A and 3B, except that the electronic device 300 as illustrated in FIGS. 3E and 3F includes a center of mass 306 for the device 300 that is located substantially near one of the longer side and the grip area on one of the longer sides of the device. In FIGS. 3E and 3F, the center of mass 306 for the device is located substantially near the side 302d. The device 300 also includes a grip area 310 on the side 302d where the center of mass 306 is located. In one exemplary implementation, the grip area 310 is a cylindrical-shaped grip area. The grip area 310 extends along at least a portion of the side 302a and may extend along the entire length of the side 302d. In some implementations, the grip area 310 may extend beyond either or both ends of the side 302d. The electronic device 300 as illustrated in FIGS. 3E and 3F may include the other features as described above with respect to FIGS. 3A and 3B.

Figure 4A:
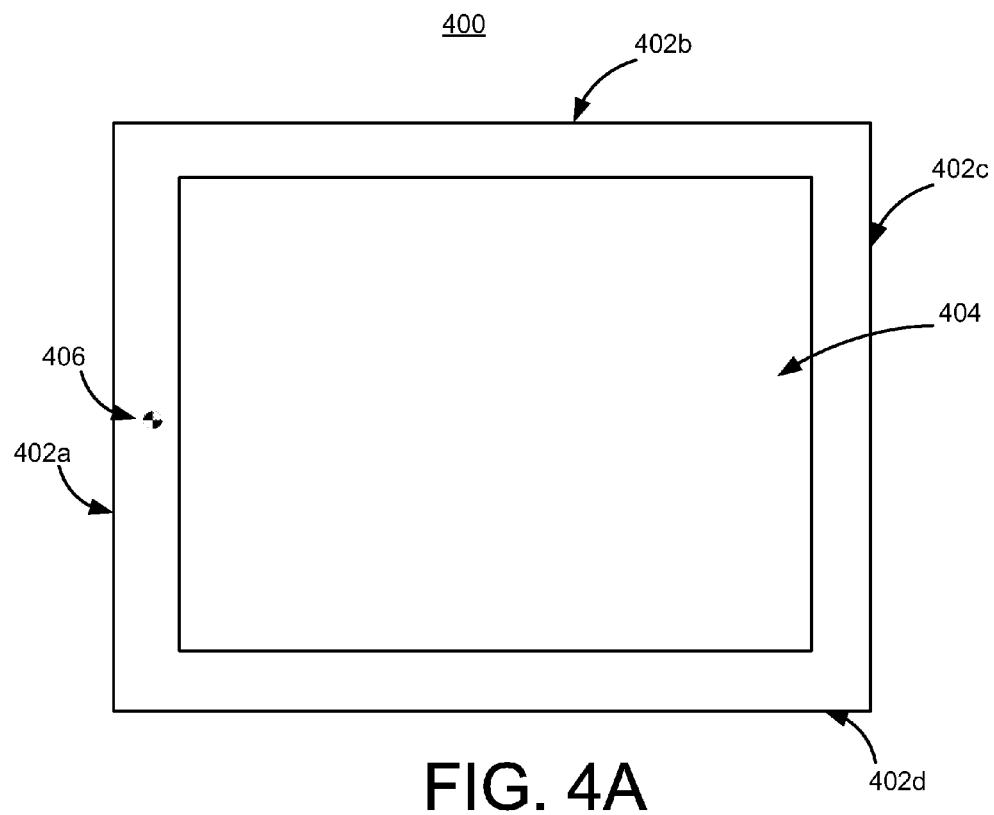
FIG. 4A is a top view and FIG. 4B is a side view of exemplary sketches of an electronic device having a non-uniform thickness.
Figure 4B:
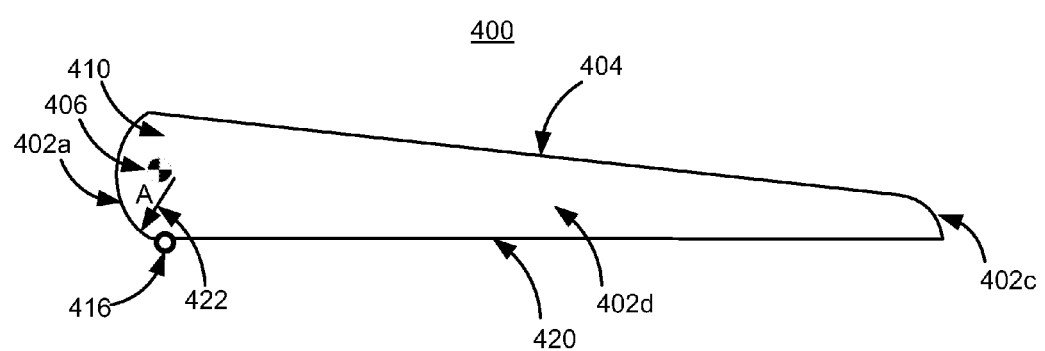

Referring to FIGS. 4A and 4B, a top view (FIG. 4A) and a side view (FIG. 4B) illustrate an exemplary sketch of an electronic device 400 having a non-uniform thickness along a length of the device 400. In this manner, the non-uniform thickness may result in one side 402a having a larger thickness that tapers to the opposite side 402c, where the opposite side 402c has a smaller thickness. The side 402a may make it easier for a user to grip and hold the device 400 with a single hand and/or with two hands where the hand on the side 402c may only need to support any remaining offset moment for the device 400 to keep the device 400 level.

Similar to the device 300 of FIGS. 3A and 3B, the device 400 may be square-shaped or rectangular-shaped. The electronic device 400 includes four sides 402a-402d. If the device 400 is square-shaped, then the sides 402a-402d are substantially equal in length. If the device 400 is rectangular-shaped, then sides 402a and 402c are substantially equal in length and shorter than side 402b and 402d, which are substantially equal in length.

The electronic device 400 includes a display 404. The electronic device 400 illustrated in FIGS. 4A and 4B may be any type of electronic device, as described above with respect to electronic device 100 of FIGS. 1A and 1B.

The electronic device 400 includes a center of mass 406 for the device that is located substantially near a side 402a. The side 402a has a width that is greater than the side 402c. The side 402a may include rounded edges such that the side 402a provides a cylindrical-shaped grip area 410 as part of the housing of the device 400. The cylindrical-shaped grip area 410 may have a radius A 422, where A may designed at different lengths, which would result in a different width for the side 402a.

The larger width at the side 402a may allow the electronic components for the device 400, other than the display 404, to be located substantially near the side 402a. The location of the components on the side 402a locates the center of mass 406 for the device 400 near the side 402a. The center of mass 406 may be located within the grip area 410.

The bottom side 420 of the device 400, which is opposite the display top surface 404, may be non-parallel in relation to the display 404. The bottom surface 420 may slant at an angle from the side 402a to the side 402c.

The larger width at the side 402a, the shape of the grip area 410 in the form of a handle and the center of mass 406 located near the side 402a may enable a user to hold the device 400 level with a single hand. The device 400 also may include an accelerometer module that would enable the user to hold the side 402a with either hand.

The device 400 may include one or more device controls 416 located on an underside of the device in or near the grip area 410. In this manner, the user's hand that is holding the device also may be used to access and control the functionality of the device 400 using the device controls 416. The device controls 416 may include controls such as those described above with respect to device controls 216 of FIG. 2B.

In other exemplary implementations, the device 400 may be configured with the center of mass 406 substantially near one of the longer sides, 402b or 402d, as described above with respect to device 300 in FIGS. 3E and 3F. Similarly, the grip area 410 may be located along one of the longer sides, 402b or 402d.

Figure 5:
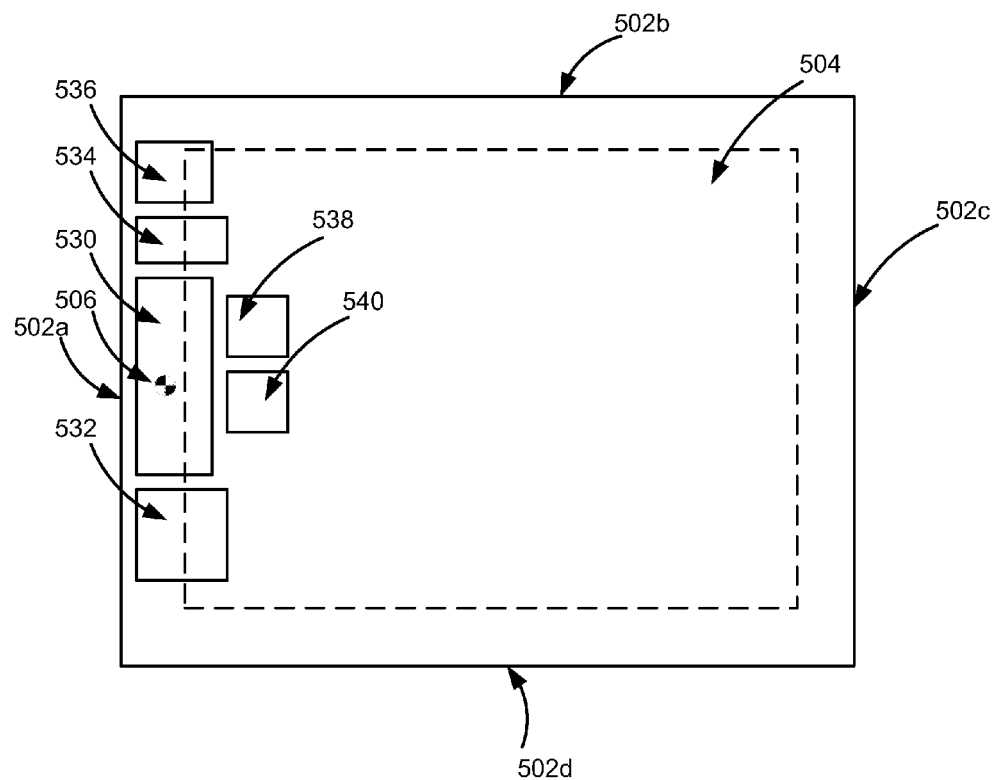
FIG. 5 is top view of an exemplary sketch of an electronic device including a block diagram of components.

Referring to FIG. 5, a top view illustrates an exemplary sketch of an electronic device 500 showing an exemplary placement of electronic components substantially near one side 502a of the device 500. The device 500 may be any of the electronic devices, as illustrated in the above figures. The device 500 may include four sides 502a-502d and a display 504.

The placement of the components is illustrative of the potential placement of the components in the device 100 of FIGS. 1, 2A, 2B and 2C, the device 300 of FIGS. 3A-3D and the device 400 of FIGS. 4A and 4B. The device 500 may include one or more batteries 530, at least one processor 532, a sensor module 534 that includes an accelerometer, a radio module 536, a camera module 538, and at least one memory 540. These devices may be operably coupled to each other and to the display 304. Other hardware devices, which are not shown, also may be located. The location of these components substantially near the side 502a places the center of mass 506 for the device 500 near the side 502a. In this manner, as discussed above, a user may comfortably hold the device with a single hand and/or with two hands, where the second hand merely supports any offset moment.

Figure 6A:
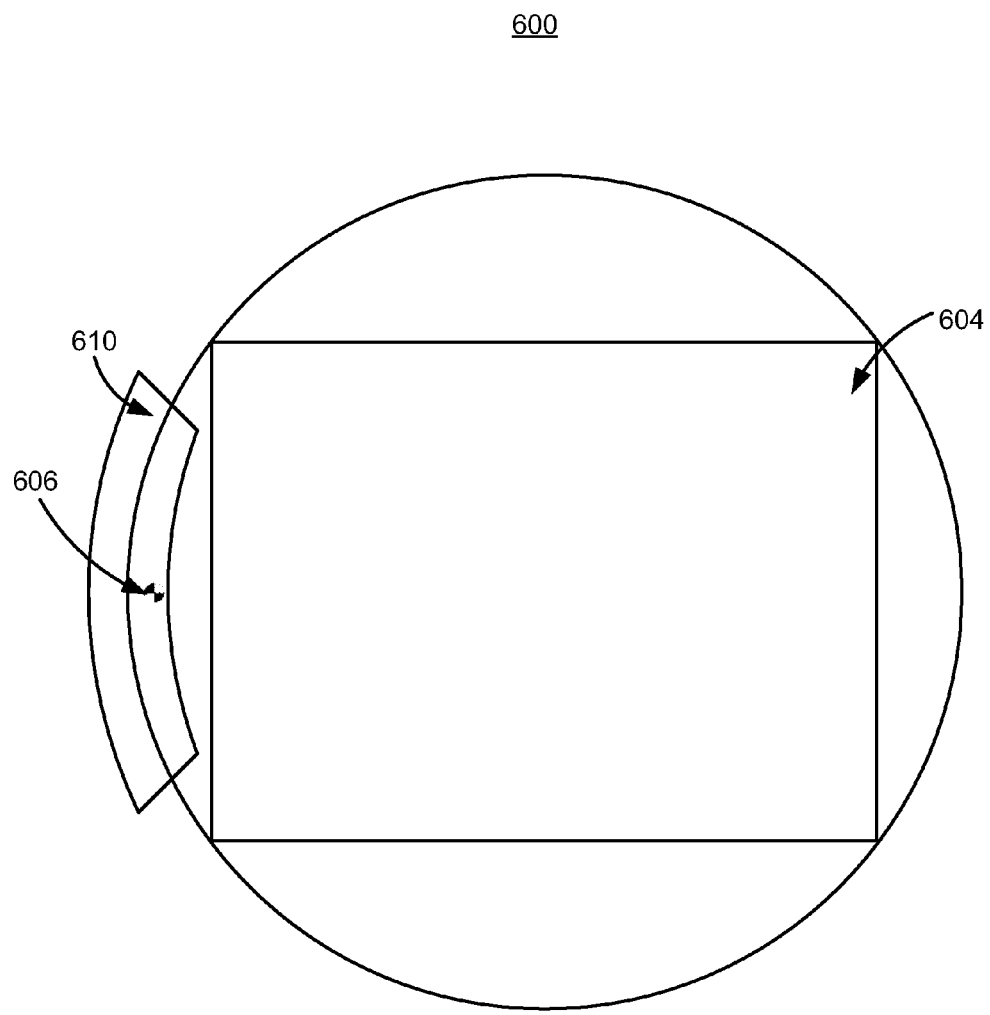
FIG. 6A is a top view of an exemplary sketch of an electronic device having a circular shape and a square-shaped display.

While the above figures have illustrated electronic devices that share the same shape as the display, other implementations are possible where the device and the display are different shapes. Referring to FIG. 6A, a top view illustrates an exemplary sketch of an electronic device 600 that is circular-shaped. The electronic device 600 includes a display 604 that is square-shaped. The electronic device 600 may be any type of electronic device, as described above with respect to electronic device 100 of FIGS. 1A and 1B.

In this exemplary implementation, a center of mass 606 for the device 600 is located substantially near an edge of the device. In this manner, a user may hold the device 600 with a single-hand, where the center of mass 606 is within that one hand to enable a user to easily balance and hold the device 600 with the single hand.

The device 600 may include an optional grip area 610. The grip area 610 may be located at the same location as the center of mass 606. The grip area 610 may be contoured in the same shape as the device 600. In one exemplary implementation, the grip area 610 is only on a portion of the device 600. In other exemplary implementations, the grip area 610 may surround all of the device 600 and may include an indication on the outside of the grip area 610 as to where the center of mass 606 point is located.

In one exemplary implementation, the device 600 includes an accelerometer module, which enables the user to rotate the device 600 such that the content on the display 604 remains upright with respect to the user. In this manner, the user may hold the device 600 with either hand.

While FIG. 6A illustrates a circular-shaped device 600 having a square-shaped display 604, other device and display types are also possible, where the center of mass for the device is located substantially near one of the edges or sides of the device to allow a user to hold the device comfortably with a single hand. For example, FIGS. 6B-6D illustrate alternative side views of exemplary sketches of devices having different-shaped grip areas.

Figure 6B:
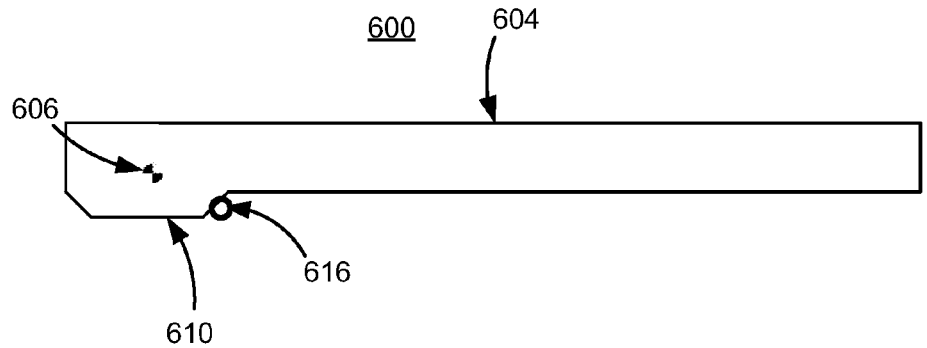
FIGS. 6B-6D are side views of exemplary sketches of an electronic device having a square or rectangular shape and different-shaped grip areas.

Referring to FIG. 6B, the device 600 may include a display 604 which may be a square-shaped display 604 or a rectangular-shaped display 604. The grip area 610 may be a trapezoidal-shaped grip area having the center of mass 606 located within the grip area 610. The trapezoidal-shaped grip area 610 also may include one or more device controls 616. In this example, the trapezoidal-shaped grip area 610 may form a housing for the device components including, for instance, one or more rows of batteries to power the device 600.

Figure 6C:
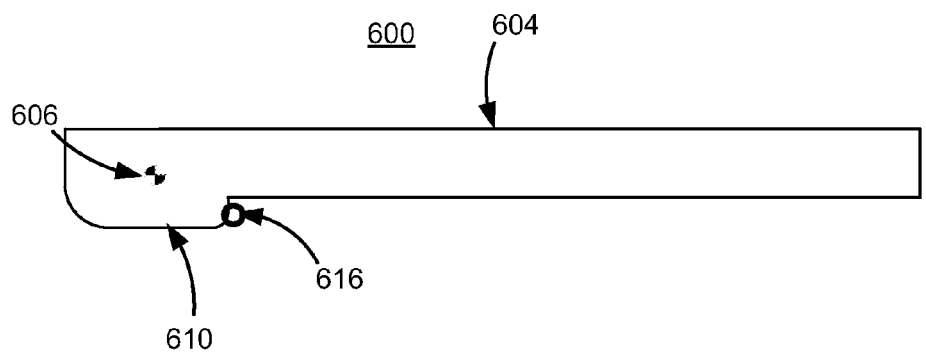

Referring to FIG. 6C, the device 600 may include a display 604 which may be a square-shaped display 604 or a rectangular-shaped display 604. The grip area 610 may be a rectangle-shaped grip area with rounded corners and having the center of mass 606 located within the grip area 610. The rectangle-shaped grip area 610 also may include one or more device controls 616. In this example, the rectangle-shaped grip area 610 may form a housing for the device components including, for instance, one or more rows of batteries to power the device 600.

Figure 6D:
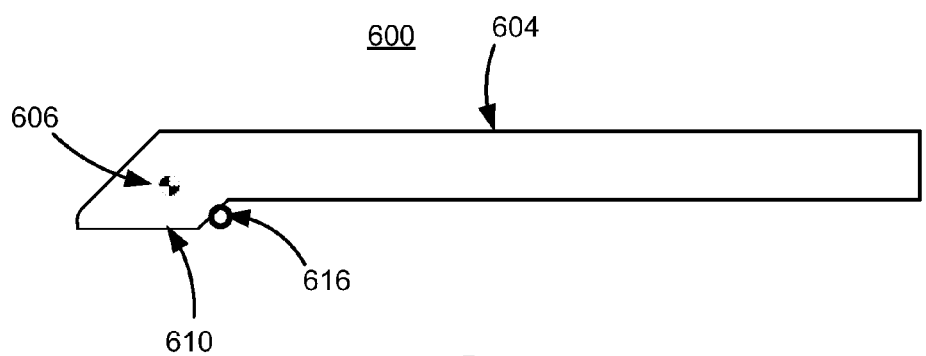

Referring to FIG. 6D, the device 600 may include a display 604 which may be a square-shaped display 604 or a rectangular-shaped display 604. The grip area 610 may be a parallelogram-shaped grip area with one or more rounded corners and having the center of mass 606 located within the grip area 610. The parallelogram-shaped grip area 610 also may include one or more device controls 616. In this example, the parallelogram-shaped grip area 610 may form a housing for the device components including, for instance, one or more rows of batteries to power the device 600.

Figures 6E, 6F:
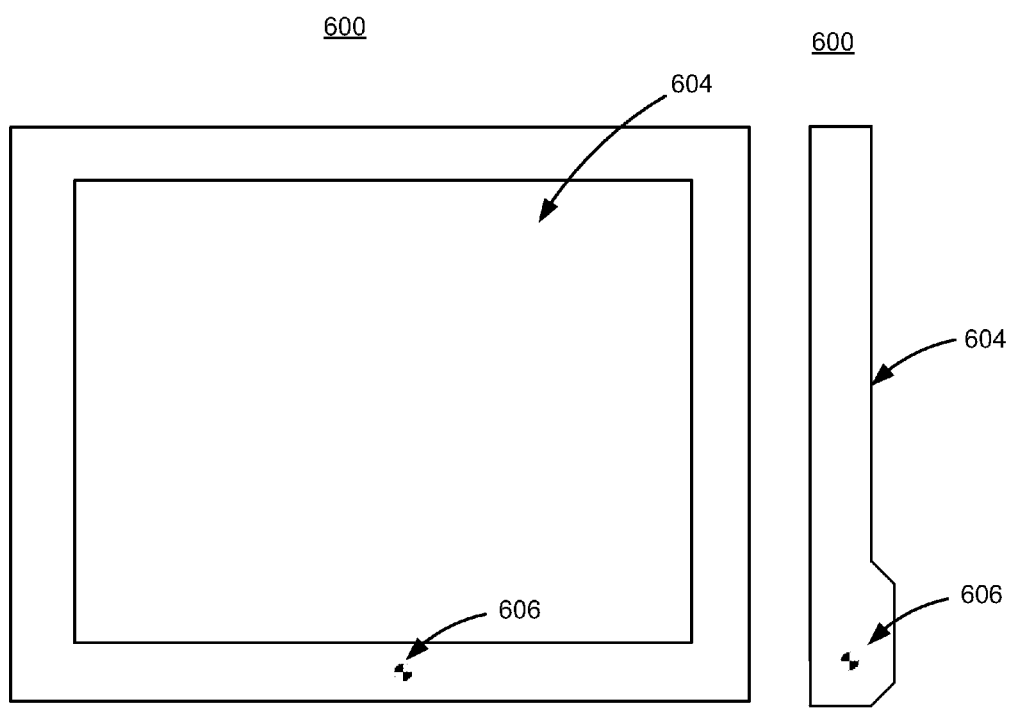
FIG. 6E is a front view of an exemplary sketch of the electronic device of FIG. 6B standing on a bottom edge.
FIG. 6F is a side view of an exemplary sketch of the electronic device of FIG. 6B standing on a bottom edge.

Referring to FIGS. 6E and 6F, the device 600 from FIG. 6B is illustrated with a front view (FIG. 6E) and a side view (FIG. 6F), while standing on one side of the device. In this manner, the device 600 may stand upright because the center of mass 606 is located towards the side having the grip area. The grip area may include a flat area on the one side to enable the device 600 to stand upright. In one exemplary implementation, the grip area may include feet or deployable feet on the one side to assist the device 600 in standing upright on that one side.

In one exemplary implementation, standing the device 600 upright enables a user to view video on the device in this upright orientation. The device 600 is stable standing upright on the one edge, at least in part, because of the location of the center of mass 606 towards the side having the grip area.

Other shaped grip areas are contemplated and within the scope of this application even though they are not illustrated or described.

In the exemplary implementations of the devices discussed above, the display may be implemented using a transparent or translucent display material.

Figure 7:
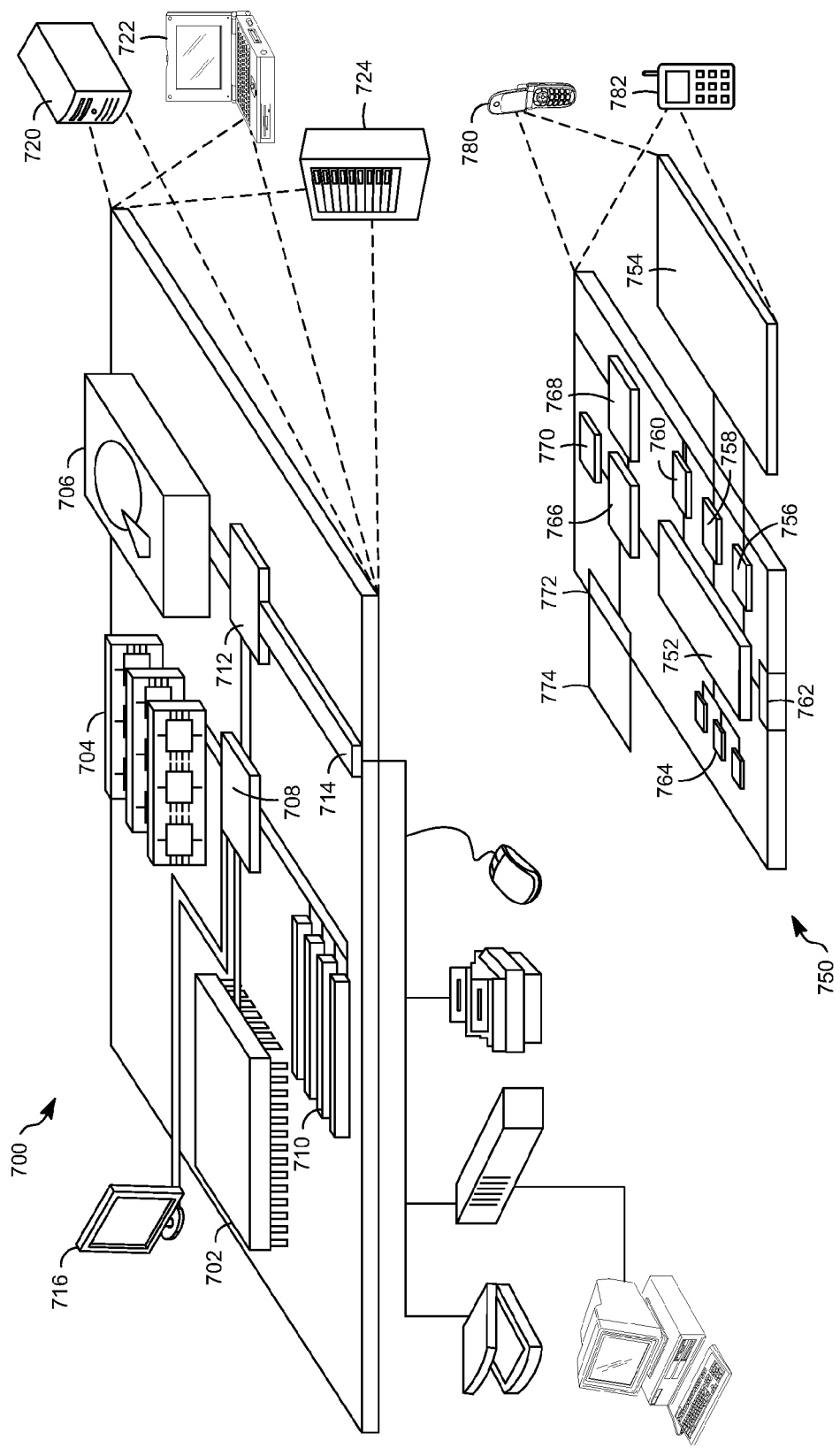
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, tablet devices and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The information carrier is a non-transitory computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus having four sides, comprising: a processor; and a display that is operably coupled to the processor, the display comprising four sides, wherein: each of the four sides of the display is equal in length, a center of mass for the apparatus is located substantially between a geometric center of the apparatus and an edge of one of the four sides of the apparatus, and one of the four sides of the apparatus comprises a grip area that is located on a same side as the center of mass for the apparatus and the grip area includes a flat area on one side to enable the apparatus to be oriented to stand independently upright on the flat area on the edge of the side of the apparatus, wherein the grip area comprises a shaped area for holding the apparatus that is a different shape from other portions of the apparatus and the shaped area extends from and is disposed below a bottom side of the apparatus when the display of the apparatus is in an orientation facing upward.

2. The apparatus of claim 1 wherein the center of mass for the apparatus is located substantially near the edge of one of the four sides of the apparatus.

3. The apparatus of claim 1 wherein the center of mass for the apparatus is located substantially near a center of the edge of one of the four sides of the apparatus.

4. The apparatus of claim 1 further comprising a plurality of components, wherein the grip area forms a housing for one or more of the components.

5. The apparatus of claim 1 further comprising one or more rows of batteries, wherein the grip area forms a housing for the one or more rows of batteries.

6. The apparatus of claim 1 wherein the grip area comprises a rounded corner.

7. The apparatus of claim 1 wherein the grip area comprises one or more device controls located on an underside of the device when the display of the apparatus is in an orientation facing upward.

8. The apparatus of claim 1 wherein the grip area comprises a non-rounded corner.

9. The apparatus of claim 1 wherein at least a portion of the display comprises a transparent display.

10. An apparatus, comprising: a housing for a mobile device, the housing having four sides; a display within the housing, the display having four sides; one or more components located within the housing substantially near an edge of the housing, wherein a center of mass for the apparatus is located substantially between a geometric center of the apparatus and the edge of the housing; and a grip area that is located on a same side as the center of mass for the apparatus, wherein the grip area includes a flat area to enable the apparatus to be oriented to stand independently upright on the flat area, wherein the grip area comprises a shaped area for holding the apparatus that is a different shape from other portions of the housing and the shaped area extends from and is disposed below a bottom of the housing when the display of the apparatus is in an orientation facing upward.

11. The apparatus of claim 10 wherein the center of mass for the apparatus is located substantially near the edge of the housing.

12. The apparatus of claim 10 wherein the grip area forms a housing for one or more of the components.

13. The apparatus of claim 10 further comprising one or more rows of batteries, wherein the grip area forms a housing for the one or more rows of batteries.

14. The apparatus of claim 10 wherein the grip area comprises a rounded corner.

15. The apparatus of claim 10 wherein the grip area comprises one or more device controls located on an underside of the device when the display of the apparatus is in an orientation facing upward.

16. The apparatus of claim 10 wherein the grip area comprises a non-rounded corner.

17. The apparatus of claim 10 wherein the display is square-shaped.

18. The apparatus of claim 10 wherein the display is rectangular-shaped.

* * * * *